March 18, 1952  J. F. GRIFFIN  2,589,371
PROTECTIVE DEVICE FOR REMOTE-CONTROL SYSTEMS
Filed May 10, 1947
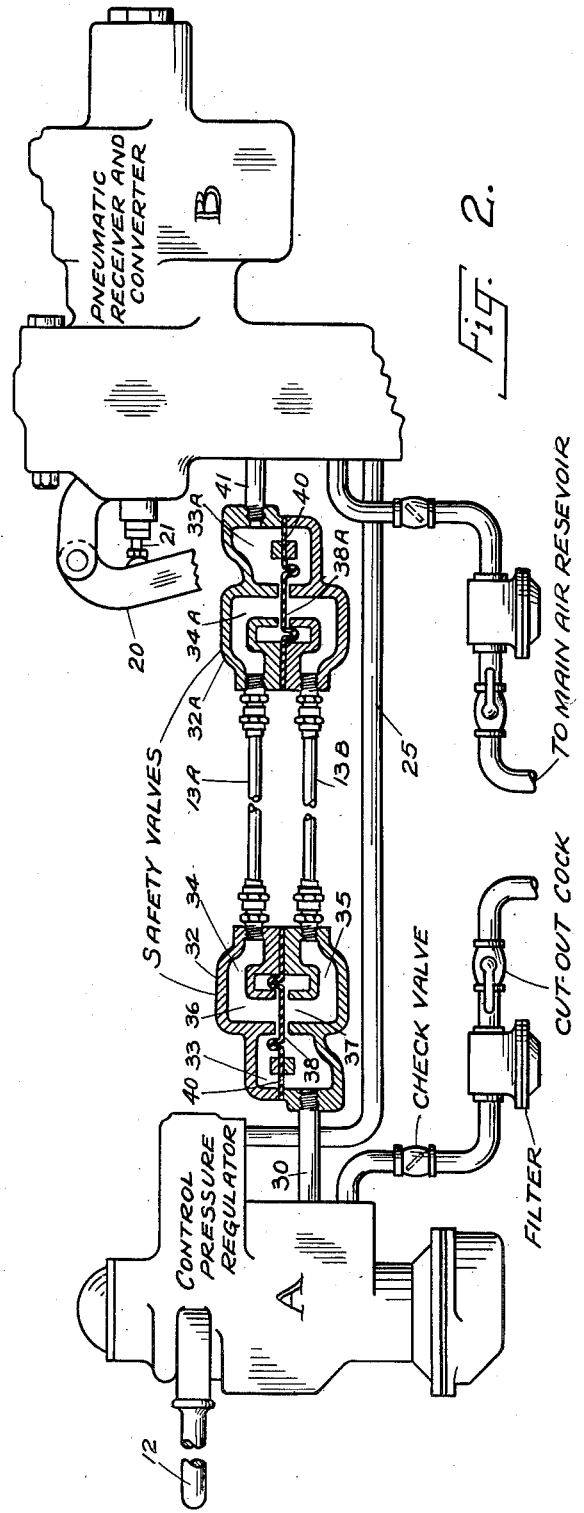
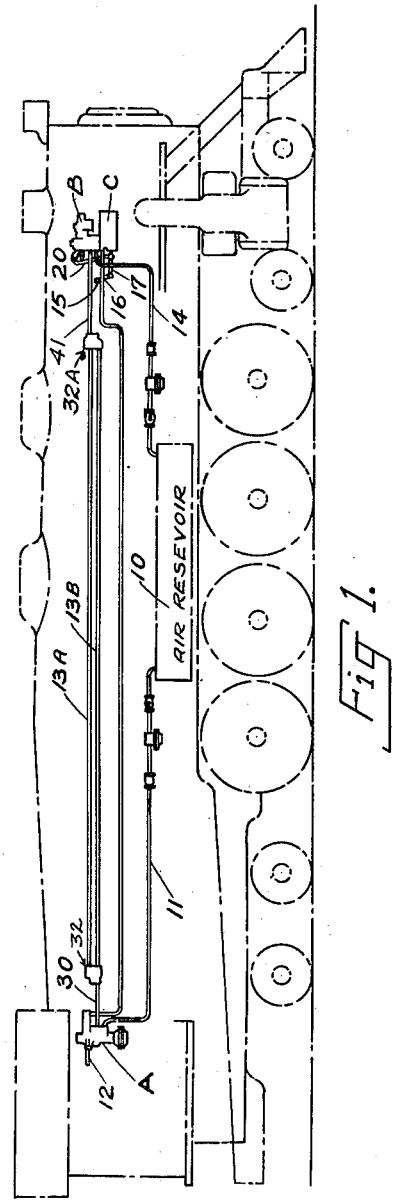
JOSEPH F. GRIFFIN
INVENTOR Patented Mar. 18, 1952

2,589,371

UNITED STATES PATENT OFFICE 2,589,371

PROTECTIVE DEVICE FOR REMOTE-CONTROL SYSTEMS

Joseph F. Griffin, Hammond, Ind., assignor, by mesne assignments, to American Throttle Company, Inc., New York, N. Y.

Application May 10, 1947, Serial No. 747,337

2 Claims. (Cl. 137—153)

The present invention relates to pneumatic control systems for regulating the operation for various mechanisms from a remote point and particularly to an improved system for pneumatically operating and controlling the position of the steam throttle valve of a locomotive from the cab.

In pneumatic control systems of the type contemplated herein a regulable pressure-control transmitter at the control station determines the variable pressure of air conducted from a supply source through a pipe to a receiver or translator for governing the air pressure supplied to a pneumatic motor at the point where the operation is to be carried out. As applied to a locomotive, a lever in the locomotive cab is adjustable to regulate the pressure of air conveyed through a pipe extending along the sides of the locomotive to mechanism that actuates the locomotive throttle valve which is located forwardly of the cab on the locomotive as, for example, in the smoke box in the case of multiple throttles. The pressure conveyed through the control pipe is received by a translator and governs the pressure supplied to and extent of operation of a pneumatic motor which is mechanically coupled to the operating shaft of the locomotive throttle so as to move it from open to closed position and adjust it in various positions in between. Inasmuch as the control pressure is conducted through a pipe running along the side of the locomotive there is a possibility that if the pipe breaks the throttle might on release of pressure suddenly close. Although the probability of this control pipe breaking is rather remote, it is the object of the present invention to provide protective devices which will guard against such a possibility.

The invention will be best understood upon consideration of an illustrative embodiment thereof when read in conjunction with the accompanying drawings in which:

Figure 1 is a diagrammatic view illustrating the application of a pneumatic control system to a locomotive for regulating the throttle valve at the front end thereof by remote control from the locomotive cab; and Figure 2 is a diagrammatic view on a larger scale of the pneumatic control system with some parts of the protective apparatus embodying the present invention shown in section to illustrate details of its construction.

Referring first to Figure 1 the numeral 10 designates an air reservoir from which a pipe 11 leads to a pneumatic pressure-control transmitter A mounted in the locomotive cab. Manipulation of the control lever 12 of the transmitter A regulates the air pressure which is conducted through piping 13A, 13B, to a receiver or translator B mounted near the front end of the locomotive. Acting in accordance with the control pressure the receiver B governs the amount and hence pressure of air which the pneumatic piston motor C may receive from the reservoir 10 through a pipe 14 for the purpose of actuating the shaft 15 of the locomotive throttle. The motor C is mechanically connected to the throttle shaft 15 by a lever 16 interposed between the shaft of the locomotive throttle and the piston 17 of the pneumatic motor C. Thus as the lever 12 of the transmitter A is moved to increase or decrease the pressure conveyed through the piping 13A, 13B to the receiver B, the latter governs the pressure that may be received by the throttle actuating motor C from the reservoir 10. The receiver B has a follow-up lever 20 connected with the piston 17 of motor C for cooperation with the adjustable piston-like stop 21 of the receiver B to govern the position of valves within the receiver for the purpose of regulating the pressure of air supplied to the motor C to operate it for actuating the throttle in prompt and accurate compliance with manipulation of the cab lever 12.

A special control line 25 is also provided so that when desired the locomotive throttle may be closed quickly, that is at a rate faster than effected through gradual movements of lever 12. Inasmuch as mechanisms of this type are generally known none of the detailed construction of the transmitter A or the receiver B are described herein since it is deemed that a general description of the system will suffice for the purposes of the present specification.

In accordance with the invention instead of employing a single pipe through which to conduct the control pressure determined by the operating lever 12 in order to operate the throttle actuating motor C, a pair of pipes 13A and 13B convey the control pressure from the transmitter A to receiver B. At each end of the pressure line adjacent the transmitter A and the receiver B, or preferably within the bodies thereof, valve mechanisms 32 and 32A are provided which act normally so that the same control pressure as regulated by lever 12 is conducted through both pipes between the transmitter A and the receiver B while also assuring that the control pressure is maintained through one of these pipes in case the other breaks. The air pressure taken from the reservoir 10 through the pipe 11 as modified by the adjustment of the control lever 12 is conveyed through a channel or nipple 30 into a chamber 33 in the body of valve 32. From this chamber passages 34 and 35 lead to the pipe 13A and 13B, respectively. The ports 36, 37 admitting the air from the chamber 33 to these passages are located directly opposite each other with a flexible diaphragm 38 interposed between them and adapted to seat against either of the ports 36, 37 and shut off the communication between the chamber 33 and the related passage 34, 35. Where, as is shown in the drawings, the diaphragm 38 is mounted and held in place between two halves of the valve body 32 one or more orifices 40 are formed through the diaphragm 38 so that equal pressure may be maintained on both sides thereof and so that both passages 34 and 35 are in communication with the chamber 33. At the receiving end of the line a similar valve 32A is mounted and the chamber 33A thereof is connected by a single nipple 41 with the receiver B.

In operation the manipulation of the control lever 12 is followed by corresponding opening and/or closing movement of the locomotive throttle as varied pressures are conveyed through both the pipes 13A, 13B and interpreted by the receiver B to govern the movements of the throttle actuating motor C. Under such conditions, whatever may be the setting of the control lever 12 to govern the throttle, equal pressures exist in the pipes 13A and 13B and therefore on opposite sides of the diaphragms 38 and 38A within protective valves 32, 32A with the result that the two diaphragms remain in mid-position between the faces of the valve ports 36, 37 in each valve. If, however, either of the pipes 13A or 13B should break, the release of pressure therein due to air escaping would relieve one side or the other of the diaphragms 38, 38A in both valves from pressure; the greater pressure on the opposite side would then force the diaphragms against the ports related to the broken pipe to close off the leaking line. For example, if the pipe 13A breaks the pressure on the under side of the diaphragms 38 in valve 32 becomes greater than on the upper side, the diaphragm moves against the seat around port 36 thereby cutting off communication between the chamber 33 and passage 34. At the same time the diaphragm in valve 32A at the opposite end of the pressure line also closes off the passage 34A in this valve so that the pressure which is retained in the pipe 13B is not dissipated via the chamber 33A back through the passage 34A and pipe 13A to bleed off at the point at which the pipe 13A broke.

Although a specific form of protective valve has been described in detail herein, it will be understood that the protective principles illustrates by this structure may equally well be embodied in differential pressure valves of other construction but operating to achieve the same results.

What I claim is:

1. A protective valve having a body comprising a pair of pressure chambers separated by a transverse dividing wall formed with a slot-shaped port placing the chambers in communication with each other; a conduit connected to one of said chambers for admitting pressure fluid thereto or receiving it therefrom; a flexible, pressure deformable diaphragm extending through said slot-shaped port between opposite sides thereof and projecting from said dividing wall across the other of said chambers so as to divide it into two separate sections; a pair of conduits each connected to one section of said other chamber at opposite sides of said diaphragm; and means securing said diaphragm to said body at opposite sides of said dividing wall so that when the diaphragm is subjected to unequal pressures on its opposite sides it contacts one or the other side of said slot-shaped port to cut off communication between said first chamber and that section of said other chamber in which the lower pressure exists, whereby when leakage occurs from one or the other of said pair of conduits communication between the related section of said second chamber and said first chamber is cut off.

2. A protective valve as defined in claim 1 in which ports for the conduits leading from said second chamber are formed in closely adjacent relation in its outer wall opposite said dividing wall and the flexible diaphragm is attached at one end in a position between said ports so as to be subjected on opposite sides to the pressures existing in the respective pipes.

JOSEPH F. GRIFFIN.

REFERENCES CITED

The following references are of record in the file of this patent:

UNITED STATES PATENTS

| Number | Name | Date |
| --- | --- | --- |
| 2,329,363 | Thomas | Sept. 14, 1943 |

FOREIGN PATENTS

| Number | Country | Date |
| --- | --- | --- |
| 543,894 | Great Britain | Mar. 18, 1942 |